United States Patent

[11] 3,597,797

| [72] | Inventor | Martin Delille<br>Aachen, Germany |
|---|---|---|
| [21] | Appl. No. | 872,540 |
| [22] | Filed | Oct. 30, 1969 |
| [45] | Patented | Aug. 10, 1971 |
| [73] | Assignee | Uniroyal Engelbert Deutschland AG<br>Aachen, Germany |
| [32] | Priority | Nov. 14, 1968 |
| [33] | | Germany |
| [31] | | P 18 08 742.8 |

[54] TIRE-VULCANIZING PRESS
14 Claims, 4 Drawing Figs.

[52] U.S. Cl. .................................................. 18/17 W
[51] Int. Cl. .................................................. B29h 5/02
[50] Field of Search........................................ 18/17 K, 17 W

[56] References Cited
UNITED STATES PATENTS

| 2,730,763 | 1/1956 | Brundoge | 18/17 |
| 2,736,059 | 2/1956 | Frank | 18/17 |
| 2,743,480 | 5/1956 | Frank | 18/17 |
| 2,778,060 | 1/1957 | Brundoge | 18/17 |
| 2,858,566 | 11/1958 | Brundoge | 18/17 |
| 3,337,918 | 8/1967 | Pacaarini | 18/17 |
| 3,471,895 | 10/1969 | Ulm et al. | 18/17 |
| 3,487,507 | 1/1970 | Turk | 18/17 |

*Primary Examiner*—J. Howard Flint, Jr.
*Attorney*—Norbert P. Holler

ABSTRACT: A bladder press of the well type adapted to enable belted tires and especially radial ply tires to be cured with bladders of generally conventional shape, is disclosed. The press is equipped with a tension member for limiting bladder expansion in the axial direction, the member being anchored at one end of thereof in the well and at the other end to the inwardly projecting vertex of a bell-shaped depression provided at the free, closed end of the bladder. The maximum length of the tension member is so chosen that the uppermost part of the bladder cannot engage the upper bead of the preshaped tire carcass being loaded into the mold while the bladder sides are being expanded radially into the carcass, thereby enabling air to be expelled from between the bladder and the carcass and preventing the production of tires with bead defects and entrapped air bubbles.

Patented Aug. 10, 1971

INVENTOR.
MARTIN DELILLE
BY Norbert P. Holler
ATTORNEY

Patented Aug. 10, 1971

INVENTOR.
MARTIN DELILLE

BY Norbert P. Holler
ATTORNEY

TIRE-VULCANIZING PRESS

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

This invention relates to tire-curing presses of the type where a rubber-heating bladder is expanded by means of a pressure medium, e.g. steam, into the tire carcass disposed in the interior mold space or cavity defined between two separable mold halves or sections.

In some of the known presses of the above-mentioned type, a heating bladder is used which has a hoodlike shape and which is mounted with its bottom beaded edge clamped to the toe ring of the bottom mold section. The opposite, top part of the bladder is closed and is provided with an inwardly protruding generally conical or bell-like portion (hereinafter called the bladder bell). With the press open, the bladder is collapsed and rests in a cylindrical recess, the so-called bladder well, which extends downwardly from the toe ring of the bottom mold section. In the production of a tire, the raw tire carcass is deposited by means of a loading device onto the bottom mold section, the loading device ensuring that the carcass comes to lie with its lower bead exactly centered on the lower toe ring. As soon as the carcass is deposited, preshaping steam flows into the interior of the bladder and causes the latter to expand out of the bladder well and into the interior of the tire carcass. During this operation, the upper part of the bladder ultimately engages a disk-shaped widened end of a plunger of the loading device and thereby activates a control system which cuts off the further influx of preshaping steam. At that time, this control operation causes the radial retraction of the gripping elements of the loading device and subsequently the withdrawal of the latter. During the closing of the press, i.e. even before the upper mold section engages the bottom mold section, a deformation of the tire takes place by which the originally cylindrical carcass receives its ultimate toroidal shape. As the bladder is expanded into the tire carcass, it is necessary that the bladder hug the inner surface of the carcass without folds or entrapment of air. To this end, the outer surface of the bladder has been provided with plurality of radial grooves, starting at the lower clamping region and ending at the juncture between the zenith of the bladder wall and the vertex of the bladder bell, through which grooves the air entrapped between the bladder and the carcass can escape during the bladder expansion.

The above-described hood-shaped form of the bladder was found over many years of development best suited for the shaping and curing of conventional bias-ply tires. In the manufacture of the belted tires, however, especially radial ply tires, it was found that difficulties arise when such a bladder is used. The raw carcass of a belted tire differs from the carcass of a conventional tire in that prior to being loaded into the press, the belted tire carcass already has a toroidal shape in which only minor changes occur during the curing process. This form makes it difficult to expand the bladder into the carcass with the necessary accuracy. If the aforesaid known bladders are used in the manufacture of belted tires, radial folds appear frequently on the inner wall of the carcass, air bubbles become trapped in the interior of the tire, particularly in the shoulder zones, and bead distortions, e.g. bead flashing and bead displacements, occur. An increase of the number of venting grooves on the outer bladder surface does not lead to a sufficient improvement. Even a change in the manner of expanding the bladder into the belted tire carcass, where the axial expansion of the bladder is controlled solely by a holddown plunger, i.e. the stripping plunger normally provided in the upper mold section, was unsatisfactory in the long run, as were also a variation of the depth of retraction of the bladder into the well or a variation of the pressure of the preshaping steam.

It is furthermore known to use a somewhat modified form of bladder in the manufacture of belted tires, where the bladder is preshaped to have a generally C-shaped radial cross section between the bead and the bell when expanded. In the vulcanization of belted tires with such C-bladders, the manner of control of the press is different from the control of the press in the vulcanization of conventional tires. The toroidally shaped tire carcass is engaged by the gripping elements of the loading device and deposited on the bottom mold section. Then the loading device moves back and the press starts to close, with the upper mold section being lowered toward the bottom mold section and the tire carcass arranged therebetween. Still before the upper mold section has been completely lowered onto the bottom mold section, the plunger and the upper toe ring precede the upper mold section somewhat, and the upper toe ring closes the upper bead of the tire carcass. At the same time, preshaping steam flows into the C-bladder and causes the bladder to expand into the tire carcass. The axial expansion of the bladder is hindered by an extension of the plunger protruding into the bladder bell. As the pressure of the preshaping steam rises, the bladder fills the tire carcass completely, and the air can escape through the radial grooves of the bladder. The press closes completely while the pressure of the preshaping steam is further increased, and the full vulcanization of the tire then takes place. It should be noted that the upper toe ring does not seal off the upper bead so completely that the remaining air cannot escape from between the tire carcass and the bladder, and in addition the upper toe ring is provided for this purpose with a number of vent holes.

In the attempts at vulcanization of belted tires with bladders of the first-mentioned type which have a hoodlike shape, however, considerable difficulties have been encountered, in that the air could not escape sufficiently and the shaped tires had defects. The vulcanization of belted tires in this manner thus could not be practiced successfully. When C-bladders have been used, on the other hand, it has been found that the manufacture of the C-bladders is more complicated and expensive and that the use of C-bladders requires an additional inventory as well.

The object of the invention, therefore, is to enable belted tires to be vulcanized satisfactorily with the aid of bladders normally used for the manufacture of conventional tires. The invention is characterized in that in a bladder of hood-shaped form and having a bladder bell in its upper closed portion, the bladder bell is connected with the bottom of the well in the press by means of a tension member of predetermined maximum length. Preferably the length of the tension member is such that, when the bladder is protracted or expanded into the tire carcass, the upper part of the bladder is restrained from engaging the tire carcass tightly in the region of the upper tire bead.

The use of such a tension member for restraining the axial movement of the bladder has the result that the bladder, while being expanded into the carcass by the admitted pressure medium, comes into contact with the inner surface of the carcass gradually and continuously from the bottom up, i.e. starting at the lower toe ring in the bottom mold section, expanding at first radially in the belted tire carcass after passing through the lower bead region, and increasingly filling the interior of the carcass in the bottom region thereof so that the air between the bladder and the carcass can be forced out completely at the top. The bladder thus is prevented from reaching the upper bead region of the belted tire carcass prematurely. The zenith of the bladder under the action of the preshaping steam pressure comes into contact with the upper bead region of the tire carcass only when the lateral parts of the bladder have completely filled the interior of the carcass. This enables a fault-free shaping of a belted tire carcass at the beads, the tread and the inner surface thereof to be achieved with a conventional bladder. No control of the bladder by a holddown plunger or foot member is required, whereby the provision of a complicated control operation and control mechanism, which would otherwise be needed because it is not readily possible to control the axial expansion of the bladder by a holddown foot during the simultaneous closing of the press, is avoided. With the usual pneumatic operation of the holddown foot or plunger, the same would have to be retracted in a degree depending on the increasing closing movement of the press, so that the bladder may also hug the carcass tightly in the upper regions of the latter. This would mean, however, that a very complicated control system would have to be installed, which would naturally be correspondingly susceptible to trouble.

Preferably, the tension member is provided in the form of a chain which is rotatably connected or swiveled at its upper and lower ends to the bladder and the bladder well, respectively, although the lower end connection may be a fixed rather than a swivel joint. It is also possible, however, to use a strand, rope or cable made of steel, synthetic material, or the like as the tension member, but the cable must be able to withstand the high thermal stresses to which it will be subjected.

The length of the tension member can be made adjustable by the use of adjustable anchoring elements. To facilitate the connection of the anchor fitting, the bladder bell is preferably thickened at its vertex. To make sure that the steam outlet port provided on the bottom of the bladder well is not clogged by the tension member when the bladder is located in the bladder well, the bottom of the latter is preferably covered with a screenlike or perforated plate.

The foregoing and other objects, characteristics and advantages of the present invention will be more clearly understood from the following detailed description thereof when read in conjunction with the accompanying drawings, in which.

Figure 4:
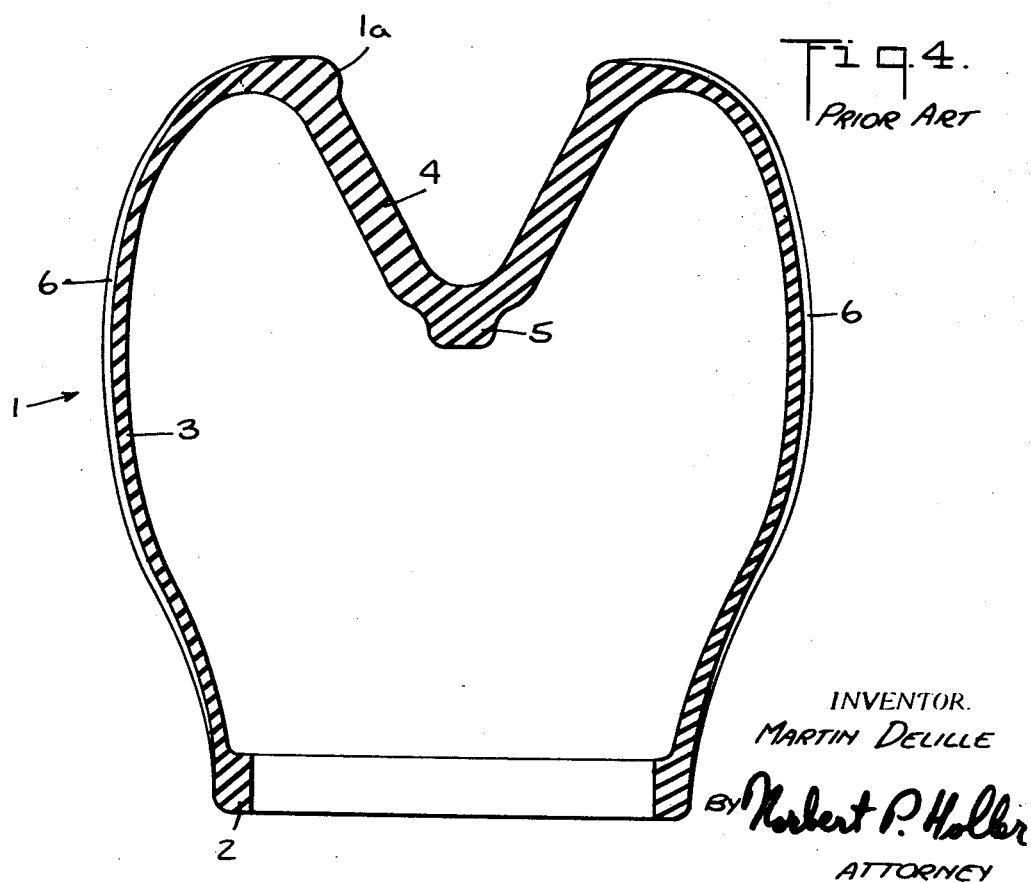
FIG. 4 is an axial section through a conventional hood-shaped bladder, illustrated for purposes of comparison.

Referring now to the drawings in greater detail, there is shown in FIG. 4 a hood-shaped bladder 1 of a known type which has the construction and form customary for the vulcanization of conventional tires, including a circular or ring-shaped bead 2 at one end to enable it to be clamped in position in the press, and generally axially extending pear-shape curved sidewalls 3 which merge at 1a into the base of an inverted bell-shaped central depression 4 in the upper part of the bladder 1. As shown, the bladder bell 4 is of generally uniform wall thickness over its entire expanse and is adapted to be engaged by the point of a holddown plunger (not shown) of the press, normally the stripping plunger. On its exterior surface, the bladder 1 is provided with a plurality of suitable venting grooves 6 extending essentially longitudinally of the bladder from the region of the bead 2 to the region 1a of the bladder at the base of the bladder bell 4.

Figure 3:
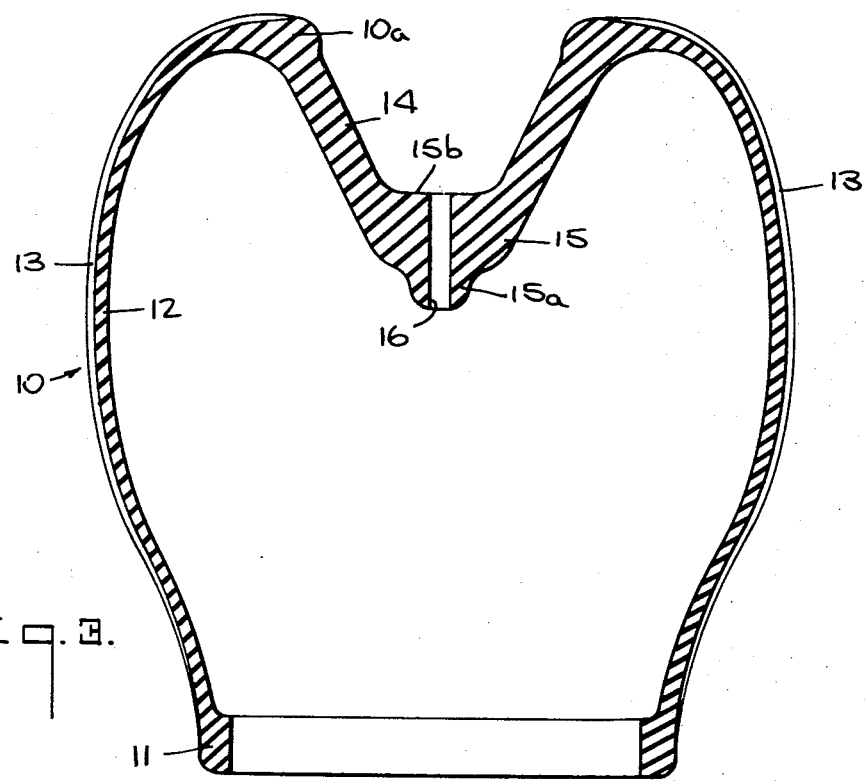
FIG. 3 is an axial section through a hood-shaped bladder modified according to the present invention and used in the structure shown in FIGS. 1 and 2.

Referring now to FIG. 3, it will be seen that the bladder 10 according to the present invention is in its basic configuration substantially the same as the bladder 1, having a bead 11, pear-shape curved sidewalls 12 with venting grooves 13 in the exterior surface thereof, and an inverted bladder bell 14. In the bladder 10, however, the wall thickness of the bell 14 is considerably increased at the vertex 15, generally to about twice the thickness of the vertex 5 of the bladder 1, in order to provide an extra strength section for a purpose which will become clear as the description proceeds. An axial bore 16 is provided in the vertex 15 of the bladder bell 14, extending entirely therethrough from an internal nose 15a to an external flat surface 15b.

Figure 1:
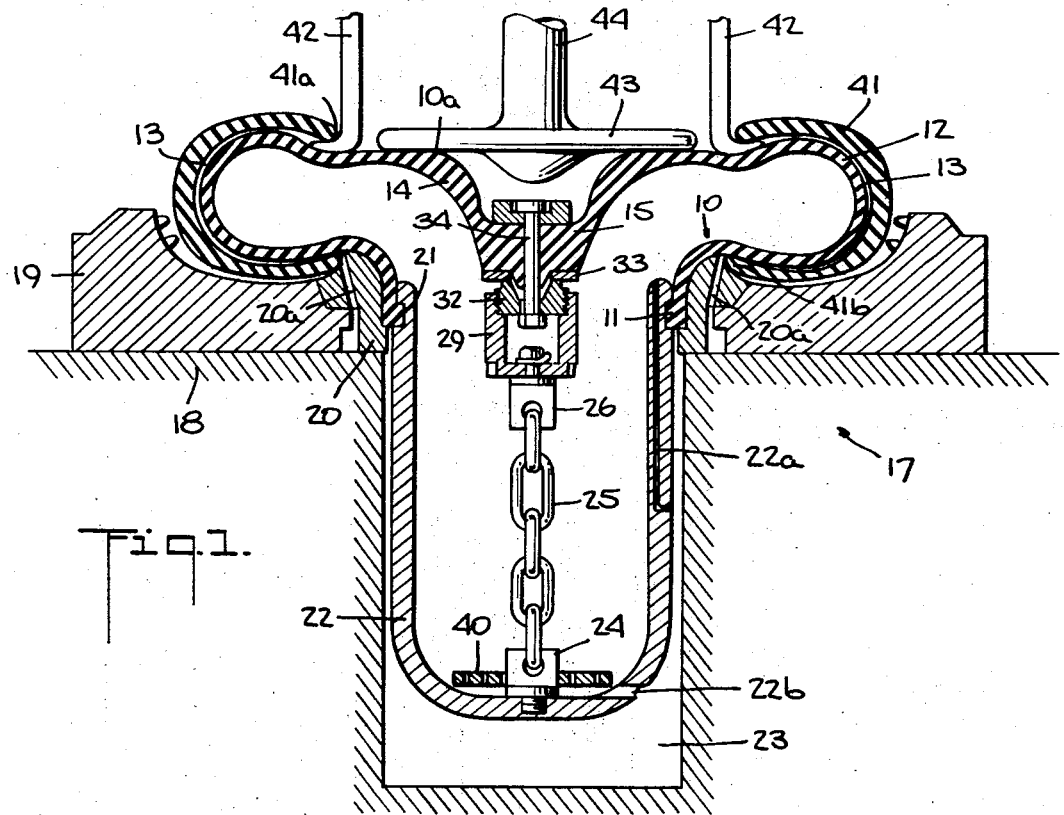
FIG. 1 is a fragmentary, diagrammatic vertical section through a tire press and illustrates the same during the loading operation with the extension of the bladder limited by a tension member according to the present invention.

As can be seen from FIG. 1, a press 17 in which the bladder 10 is to be used comprises a machine base 18 supporting the bottom mold section 19 which, together with an upper mold section (not shown) that can be lowered from above in a manner well known in the art, constitutes the mold for molding the tire. An annular toe ring 20 having venting passageways 20a therein is provided in the bottom mold section 19 along the inner periphery thereof and cooperates with an annular groove 21 provided on the exterior of the top end region of a cup-shaped bladder well 22 to clamp the bead 11 of the bladder 10 in position. The bladder well 22 is located in a depression or recess 23 of the machine frame 18 and is provided with a steam inlet duct system 22a and an outlet or drain port 22b.

Screwed into the bottom of the bladder well 22 is a shackle 24 to which is secured one end of a tension member 25, e.g. a chain as illustrated. It will be clear, of course, that a cable or strand of metal or synthetic material may be used in lieu of a chain, subject to the requirement that the material employed capable of withstanding the high temperatures to which it will ultimately be subjected. Appropriately formed strands of steel wire or glass filaments are examples of such other types of tension members. The other end of the tension member is secured to a shackle 26 which preferably is rotatably connected with the vertex 15 of the bladder bell 14.

Figure 2:
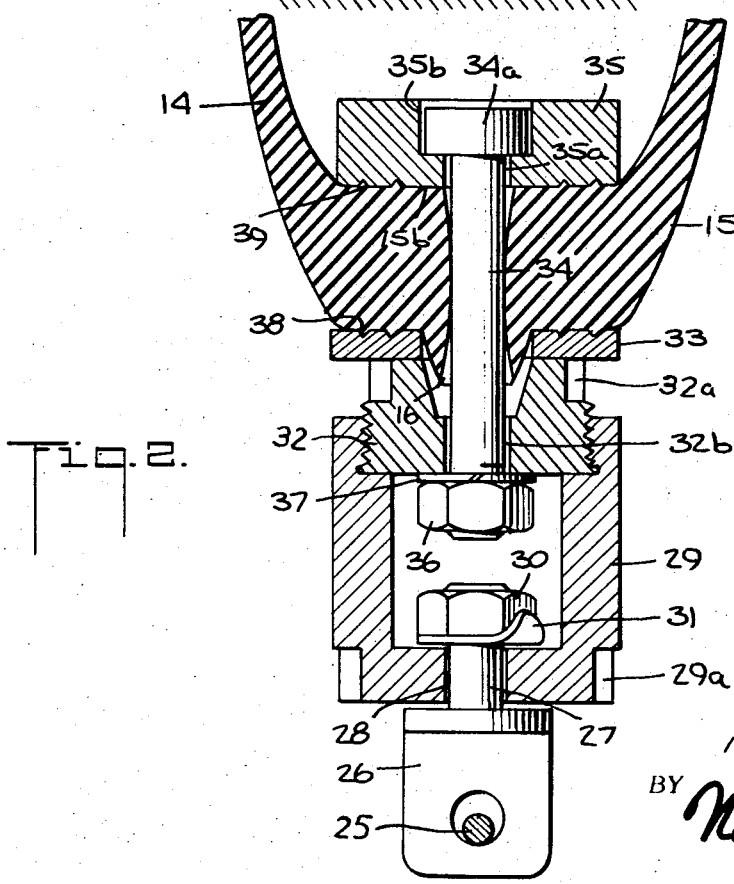
FIG. 2 is an enlarged sectional view of a portion of the structure shown in FIG. 1.

As shown in FIGS. 1 and 2, for this purpose the shackle 26 has a threaded pin or stud 27 which extends freely through a bore 28 in the bottom web of a cup-shaped member 29 and is loosely secured thereto by means of a nut 30 and lock washer 31 or the like. The member 29 has an internally threaded open top end into which an externally threaded ring member 32 is screwed, both the members 29 and 32 being provided with suitable exterior grooves or notches 29a and 32a, respectively, to enable them to be gripped by appropriate wrenches or keys. The unit 29—32 is securely clamped to the bladder bell 14, via a rigid annular pressure plate 33 interposed between the ring member 32 and the inner end of the vertex 15 of the bladder bell 14, by means of a draw bolt 34 which extends through the bore 16 in the bladder bell, a bore 32b in the member 32, and a bore 35a in a counterbored rigid pressure plate 35 seated on the flat exterior surface 15b of the bladder bell vertex, the bolt at one end having a head 34a received in a recess 35b of the plate 35 and at its other end carrying a nut 36 and a split ring spring washer 37 within the confines of the member 29. In the process of assembly of this connection, it will be understood the elements 32, 33 and 35 are first clamped to the bladder bell 14 by tightening the nut 36 on the bolt 34, and thereafter the member 29, with the shackle 26 swivelly connected thereto, is screwed onto the member 32. As the bolt is tightened, of course, the rubber in the vertex 15 of the bladder bell is compressed somewhat and pressed firmly against the bolt shank, while at the same time some of the rubber is forced, as shown at 38 and 39 in FIG. 2, into suitable grooves or other depressions provided in the proximate faces of the plates 33 and 35, respectively. This ensures the formation of a joint which is both slip free and fluidtight.

It will be clear, therefore, that upon admission of steam under pressure into the bladder 10 via the duct system 22a, the bladder is expanded and protracted out of the well 22, as shown in FIG. 1, and that after release of the internal pressure between the discharging of a cured tire from the press and the loading of a fresh raw tire carcass into the press, the bladder is rejected into the well. To prevent any possible blockage of the drain port 22b when the bladder 10 and tension member 25 are disposed within the confines of the well 22, there is provided on the bottom of the well an annular screen or perforated plate 40 which is loosely inserted in surrounding relation to the shackle 24.

In operation, when the press 17 is open and ready for the next curing cycle, a preshaped, raw belted tire carcass 41 is lowered into the bottom mold section 19 of the press by means of a system of gripping elements or fingers 42 constituting a part of the loading device, the fingers engaging under the upper bead 41a of the carcass 41. The bladder 10, during this loading operation, is in its collapsed state (not shown) and retracted into the well 22 of the press. At the end of the lowering operation, the grippers 42 hold the carcass 41 at first about 3 to 4 mm. above the bottom toe ring 20. Preshaping steam is then admitted through the duct system 22a into the interior of the bladder 10 and the bladder well 22 and forces the bladder out of the well and into the carcass 41.

With the axial expansion of the bladder 10 being limited to the extent of the length of the tension member 25, after the latter become taut, the lower bead 41b is first centrally drawn down against the bottom toe ring 20 as the increasing influx of preshaping steam causes the bladder, by virtue of the increasing radial expansion of its soft sidewall 12, to expand into the interior of the tire carcass. During this operation, the bladder walls 12 come into progressively increasing contact with the inner surface of the tire carcass, starting from the lower bead region of the latter, and any air entrapped between the bladder and the carcass escapes via the grooves 13 through the vent holes 20a of the bottom toe ring 20 and through the upper bead region of the carcass. The carcass will be held tightly in the bottom mold section 19 when the bladder pressure is about 0.2 atmosphere gauge.

During the expansion of the bladder, the upper part 10a thereof reaches a disk-shaped foot 43 of a plunger 44 and pushes the latter upward. It should be noted that the plunger 44 is not the hereinbefore referred to known holddown plunger which also serves the functions of stripping or ejecting the cured tires from the upper mold section of the press. Rather, the plunger 44 is a simple switch-actuating sensing element associated with the loading mechanism and designed to be activated when the bladder has been expanded into the tire carcass. As the plunger is displaced upwardly, it activates a control switch (not shown) in the press control circuit which causes the grippers 42 of the loading device to be disengaged from the upper bead 41a of the tire carcass by a radial inward movement toward the plunger foot 43, and the loading device to be moved up and away with the plunger 44. The closing movement of the press then starts, the upper mold section (not shown), which has the usual stripping plunger and a toe ring for the upper bead of the tire carcass, descending toward the carcass and starting to enclose the latter in the vulcanization cavity formed by the mold sections. In the press of the present invention, however, the upper mold section together with the upper toe ring and the stripping plunger move as a unite, and the plunger does not precede the upper mold section during the closing movement of the press, contrary to the case, for example, of the previously described practice of vulcanizing tires with a C-bladder, where the stripping plunger must lead the upper mold section in order to engage the bladder bell relatively early during the expansion of the bladder into the tire carcass so as to hold the vertex of the bladder down to ensure that the air can escape from between the C-bladder and the carcass. This known bladder insertion practice is relatively time consuming compared to the practice according to the present invention, since the expansion of the C-bladder can only be effected shortly before the closing of the press, whereas the expansion of the bladder of the present invention can be effected during the loading of the tire carcass into the bottom mold section.

Even when a press provided with a bladder 10 is being closed, of course, the upper toe ring reaches the upper bead 41a of the tire carcass first, due to the then not quite completely toroidal shape of the carcass. Up to this time, therefore, air can still escape in sufficient quantities from between the bladder, held up with a holding pressure of 0.2 atm., and the tire carcass. After the upper bead is closed by the upper toe ring, the preshaping pressure is increased to 0.8 atm. during the concurrent closing movement of the upper mold section, so that the carcass can balloon completely into the closing mold cavity. As soon as the cavity is closed, the pressure and the temperature of the stream in the interior of the bladder are increased appropriately to enable the vulcanization proper of the tire to take place.

Compared to the use of a C-bladder, the invention is thus characterized additionally by a shortening of the time required for inserting and preshaping the carcass. This, when considered in the light of the larger number of tires that can be produced in a press in a given time interval and against the high hourly operating costs of such presses, is an appreciable economic gain.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

Having thus described the invention, what I claim and desire to protect by Letters Patent is:

1. In a tire-curing press having separable upper and lower mold sections providing respective toe rings for engagement with the corresponding beads of a tire carcass to be vulcanized, a rubber heating bladder which is closed at its upper end and open at its beaded lower end and is tightly secured along the latter to the lower toe ring, and a well concentric with and below the lower mold section and toe ring for receiving the bladder when the same is in its collapsed state and providing a duct system to enable a fluid-heating medium under pressure to be admitted into the interior of the bladder so as to expand the same out of the well and into the interior of such a tire carcass when the latter has been loaded into the lower mold section; the improvement comprising a tension member anchored at one end in said well and at the other end to said closed end of said bladder, said tension member being of predetermined maximum length to limit the axial expansion of said bladder accordingly.

2. A press as claimed in claim 1, wherein said maximum length of said tension member is such that the latter is able to prevent said upper end of said bladder, when expanded, from engaging the upper bead region of a loaded tire carcass during the movement of the upper mold section toward the lower mold section and until the upper toe ring reaches the upper bead of the tire carcass.

3. A press as claimed in claim 1, wherein said tension member is in the form of a chain.

4. A press as claimed in claim 1, wherein said tension member is in the form of a cable or strand of metal wire.

5. A press as claimed in claim 1, wherein said tension member is in the form of a cable or strand of synthetic filamentary material.

6. A press as claimed in claim 1, wherein said tension member is swivelly anchored at least at one of the ends thereof.

7. A press as claimed in claim 1, wherein said bladder is provided at said upper end thereof with a bladder bell defined by a generally conical inwardly protruding depression, said tension member being anchored to said bladder at the vertex of said bladder bell, and an anchoring structure fixedly secured to said bladder bell at said vertex thereof for enabling connection of said tension member thereto, the wall thickness of said bladder bell at said vertex thereof being substantially greater than at other locations to provide the extra strength required for supporting the stresses exerted thereon via said anchoring structure.

8. A press as claimed in claim 7, said bladder bell being provided in said vertex thereof with an axial bore extending entirely therethrough, and said anchoring structure comprising a pair of rigid annular pressure plates positioned at the opposite faces of said vertex of said bladder bell, an externally threaded rigid ring member bearing against that one of said pressure plates located interiorly of said bladder, a draw bolt extending through said bore, said pressure plates and said ring member and having means coacting therewith for forcing said plates toward one another, thereby to compress the rubber in said vertex into slip-free and fluidtight relation with said draw bolt and said pressure plates, and an internally threaded rigid cup-shaped member screwed onto said ring member, said tension member being connected to said cup-shaped member.

9. A press as claimed in claim 8, wherein said tension member is swivelly connected to said cup-shaped member.

10. A press as claimed in claim 9, wherein said tension member is in the form of a chain.

11. A press as claimed in claim 9, wherein said tension member is in the form of a cable or strand of metal wire.

12. A press as claimed in claim 9, wherein said tension member is in the form of a cable or strand of synthetic filamentary material.

13. A press as claimed in claim 1, wherein said tension member is adjustable in length.

14. A press as claimed in claim 1, wherein a drain port is provided in the base of the well, and a perforated plate or screen is positioned over said port to prevent blockage thereof by said tension member upon collapse of said bladder.